United States Patent Office.

H. P. MARQUAM, OF HARRISBURG, PENNSYLVANIA.

Letters Patent No. 66,509, dated July 9, 1867.

---

IMPROVED COMPOUND FOR CLEANING GLASS AND POLISHING METALLIC WARES.

---

The Schedule referred to in these Letters Patent and making part of the same.

---

TO ALL WHOM IT MAY CONCERN:

Be it known that I, H. P. MARQUAM, of Harrisburg, in the county of Dauphin, and State of Pennsylvania, have invented a complete Mode of Cleaning Window and other Glass, and Polishing Fine Metallic Ware; and I do hereby declare that the following is a full and exact description thereof.

The nature of my invention consists in combining certain chemicals, the combination of which will clean window and other glass, and polish any fine metallic ware completely and in a very short time.

The following is my invention, known as Dr. Marquam's Superior Glass Cleaner and Metallic Polish:

*Composition.*

Spanish whiting, ten pounds; Venetian red, half pound; sal-soda, one ounce; cyanide potassa, half ounce. Pulverize these articles separately, mix them together completely, wet with water, and form a mass.

I claim, and desire to secure by Letters Patent—

The above compound, prepared as and for the purposes set forth.

H. P. MARQUAM.

Witnesses:
WILLIAM PLANK,
J. H. SHEARER.